United States Patent [19]

Hodge et al.

[11] 4,229,068

[45] Oct. 21, 1980

[54] FIBER OPTIC RELAY SWITCH

[75] Inventors: Malcolm H. Hodge, Claymont, Del.; William M. Dunn, Philadelphia, Pa.

[73] Assignee: TRW Inc., Cleveland, Ohio

[21] Appl. No.: 856,440

[22] Filed: Dec. 1, 1977

[51] Int. Cl.² ............................................. G02B 5/14
[52] U.S. Cl. ................................................ 350/96.20
[58] Field of Search ......................... 350/96.20, 96.21; 250/229, 236

[56] References Cited

U.S. PATENT DOCUMENTS 4,033,669  7/1977  Hanson ........................... 350/96.20

FOREIGN PATENT DOCUMENTS 1946693  8/1970  Fed. Rep. of Germany ........ 350/96.20

OTHER PUBLICATIONS

P. G. Hale, R. Kompfer, "Mechanical Optical-Fibre Switch," Electronics Letters, vol. 12, No. 15, Jul. 22, 1976, p. 388.

*Primary Examiner*—Rolf G. Hille
*Attorney, Agent, or Firm*—Neuman, Williams, Anderson & Olson

[57] ABSTRACT

A fiber optic relay switch is provided for switching an optical signal from a first fiber to a second fiber. The switch comprises a pair of cylindrical members which are axially aligned and rotatable with respect to each other. Housed in the first member is at least a first optic fiber. In the second member is provided at least two optic fibers. A coupling face is provided between the ends of the first and second member. The fiber in the first member is terminated with the end of the fiber being aligned with the coupling face of the first member and is aligned with at least one of the two fibers in the second member. The two fibers in the second member are terminated with the ends thereof being aligned with the coupling face of the second member. When the members are rotated a predetermined angular amount the fiber in the first member is aligned with the other of the fibers in the second member. This enables the switching of optical signals provided from the fiber in the first member to the first of the fibers to be switched to the second of the fibers in the second member.

12 Claims, 6 Drawing Figures

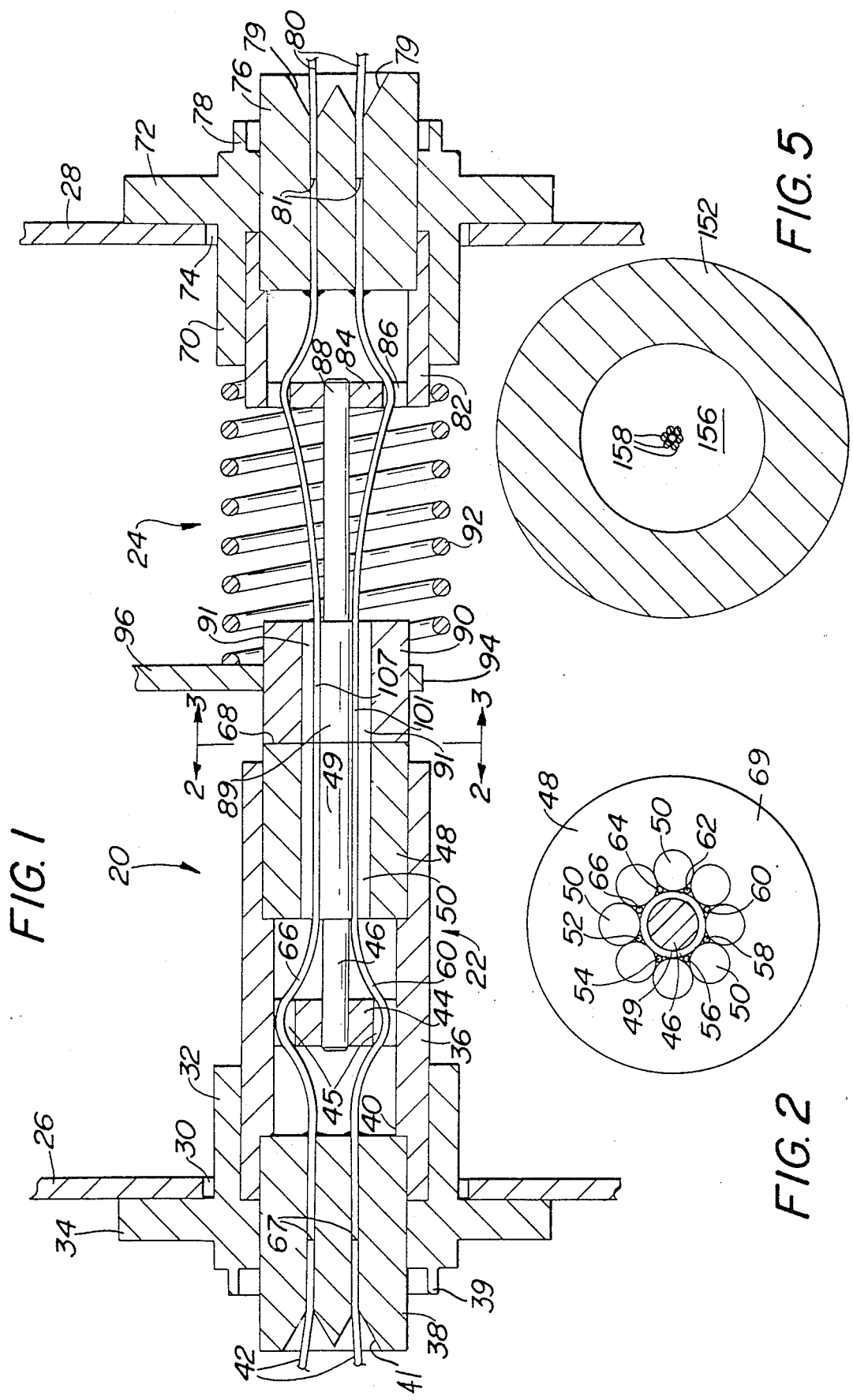

FIBER OPTIC RELAY SWITCH

This invention relates generally to fiber optics and more particularly to a fiber optic relay switch which enables the switching of optical signals from a first fiber to a second fiber.

In the past few years optical fiber technology has advanced rapidly. In many areas optical fiber systems are gaining acceptance, such as telephone, CATV long and short haul data transmission, industrial process controls, aerospace and marine communication systems.

Recently, advances have been made to enable releaseable connections between signal carrying fibers to effect an end-to-end connection of optical fibers quickly and easily. In these systems it is a necessity that the connection be made precisely and securely to minimize coupling losses and maximize efficiency.

It is known that there are various causes for coupling inefficiency between fiber ends. In single fiber joints the causes are related to the orientation, disposition and geometry of the ends of the single optic fibers at their interface or connection point.

For example, where there is transverse or lateral misalignment of the ends of the fibers with respect to each other, it results in a substantial signal loss across the interface which increases with increasing lateral displacement.

In addition, longitudinal separation of the fiber ends or end displacement also results in a substantial signal loss which increases with increasing end separation.

Finally, and most importantly, axial or angular misalignment also contributes considerably to coupling inefficiency with the loss increasing as the angle between the end faces of the optical fibers increases. The signal losses introduced by transverse displacement, and separation, axial alignment, as well as the losses occasioned by Fresnel reflection are cumulative and add considerably to the losses when coupling optical fibers.

At present there are two types of optical cables in use, namely, bundle cables comprising multi-filament conductors all carrying the same optical signal, and single fiber cables, wherein each single fiber (if more than one) comprises a separate signal channel.

In both the multi-filament conductors and the single fiber cable conductors there has been a need to provide a device which would effect the relaying or switching between either single or groups of coherent or bundle fibers in a precise and repeatable manner. However, in order to switch the signals from a first optical path to a second optical path, there are not only the problems inherent in connecting signal carrying fibers referred to above, but there is a further problem caused by the need to easily move a fiber in and out of alignment with at least a pair of optical fibers. It is therefore an object of this invention to provide a new and improved fiber optic relay switch for switching optical signals from a first fiber to a second fiber.

Another object of the invention is to provide a device which enables at least a single fiber to be accurately and optically aligned with a similar optical fiber and then to be switched into an accurate alignment with another similar fiber.

Still another object of the invention is to provide a new and improved fiber optic relay switch which enables the optical signals from at least two optical fibers to be switched to at least two other optical fibers.

Another object of the invention is to provide a new and improved fiber optic relay switch which is fabricated inexpensively and easily.

Still another object of the invention is to provide a new and improved fiber optic relay switch which can be mass manufactured.

A further object of the invention is to provide a new and improved fiber optic relay switch which utilizes a pair of cylindrical members which are axially aligned and which utilize rotary actuation of one of the members with respect to the other to enable alignment of a first fiber with either one of a pair of fibers in the second member.

These and other objects of the invention are achieved by providing a fiber optic relay switch for switching optical signals from a first fiber to a second fiber which includes a first cylindrical member which houses a first optic fiber and a second cylindrical member for housing at least two optic fibers. The two members are axially aligned with the first and second members, each having a coupling face. The fiber in the first member is terminated with the end of the fiber being aligned with the coupling face of the first member. The two fibers in the second member are terminated with the ends of the two fibers being aligned with the coupling face of the second member. The faces of the first and second member are slidably disposed with respect to each other so that in a first position of the members the end of the fiber in the first member is aligned with and optically coupled with the end of one of the at least two fibers of the second member. By rotating the members with respect to each other to a second position of the members with respect to each other, the end of the first fiber in the first member is aligned and optically coupled with the end of the other of the two fibers of the second member so that movement of the members relative to each other between the first and second positions switches the optical signals in a first path to a second path.

Other objects and many of the attendant advantages of the instant invention will be readily appreciated as the same becomes better understood by reference to the following detailed description when considered in connection with the accompanying drawing wherein:

FIG. 1 is a vertical sectional view of the fiber optic relay switch embodying the invention with portions shown in full for purposes of clarity;

FIG. 2 is a sectional view taken along the line 2—2 in FIG. 1;

FIG. 5 is an enlarged sectional view taken along the line 5—5 in FIG. 4; and

Referring now in greater detail to the various figures of the drawing wherein like reference characters refer to like parts, there is shown at 20 in FIG. 1 a fiber optic relay switch embodying the invention.

Figure 4:
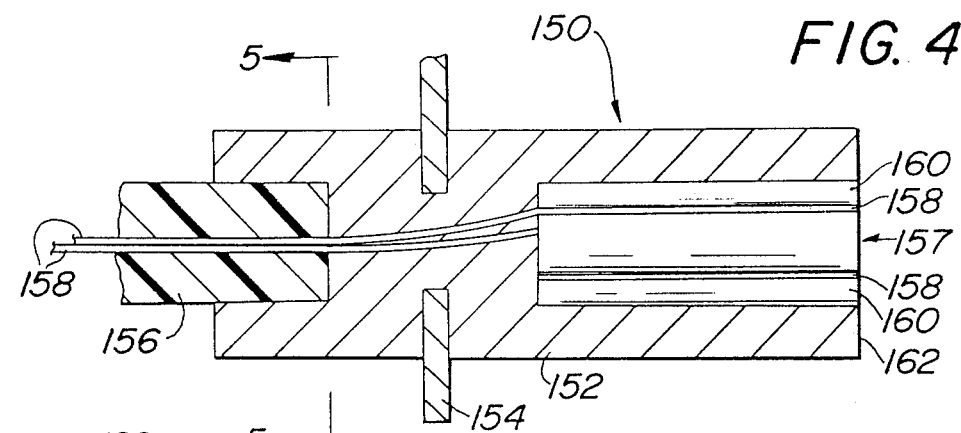
FIG. 4 is a vertical sectional view of an alternate coupling member for use in the fiber optic relay switch embodying the invention with portions shown in full for purposes of clarity.

The fiber optic relay switch 20 basically comprises a pair of coupling members 22 and 24. Coupling member 22 is fixedly secured to a mounting plate 26 and the coupling member 24 is fixedly secured to mounting plate 28.

The coupling member 22 is generally cylindrical and extends through an opening 30 in mounting plate 26. The coupling member 22 includes a cylindrical end member 32 having a cylindrical flange 34. The end member 32 is secured to the mounting plate 26, preferably by threaded fasteners (not shown) or a suitable adhesive. The end member 32 includes a cylindrical bore which is narrowest adjacent the outer end. In the larger portion of the bore of end member 32 an elongated cylindrical member 36 is secured. In the narrower portion of the bore of end member 32 a connector member 38 is secured. It should be noted that the cylindrical member 36 includes a bore 40 which has an enlarged portion in which the connector member 38 fits and is preferably press fit therein. The end member 32 includes an annular flange that surrounds the connector member 38.

The connector member 38 includes a plurality of parallel axially extending cylindrical openings 41 which are flared at the outermost end of the connector member 38.

The connector member 38 provides a suitable connector for connecting a plurality of optical fibers 42 within the openings 41 thereof to fibers extending into coupling member 22.

A cylindrical wall 44 is provided within bore 40 and is received by a press fit. The wall 44 includes a plurality of spaced openings 45 at the periphery thereof through which optical fibers extend to the interface between the coupling members 20 and 24.

At the center of the wall 44 there is provided an axially extending opening to accept one end of an elongated rod 46 which is fixedly secured to the wall 44 within the opening, preferably by a press fit.

A cylindrical fiber housing 48 is provided and is fixedly secured within an enlarged portion of bore 40 of the cylindrical member 36.

The fiber housing 48 basically comprises a cylindrical tube 49, a plurality of cylindrical rods 50 having parallel axes to the tube 49 and disposed about the periphery of the tube 49. In the preferred embodiment, the tube 49 and the rods 50 are made of glass. The rods 50 and the tube 49 are so dimensioned that each of the rods 50 tangentially abut the outer periphery of the cylindrical tube 49 and the adjacent rods. Eight of the rods 50 are provided and are angularly spaced 45° with respect to each other about the periphery of the tube.

As best seen in FIG. 2, the tube and rods 50 are so dimensioned that the interstices between each pair of rods and the periphery of the tube receive snuggly one of a plurality of optical fibers 52 through 66. That is, between each pair of glass rods and tube 49 the opening therebetween is so dimensioned that an optical fiber fits snuggly therein. Each of the fibers 52 through 66 extend through the entire fiber housing 48 and are terminated at the end of the fiber housing 48 which is disposed at the coupling interface 68 which is the interface or coupling face between the coupling members 22 and 24. The fiber housing 48 also includes a cylindrical outer jacket 69 which is preferably made of a potting material which is preferably comprised of a castable plastic, such as an epoxy resin. The jacket 69 is intimately formed about the rods 50 to securely fix the rods therein.

To form the fiber housing, the glass assembly comprised of the tube 49 and the plurality of glass rods 50 are disposed with the glass rods spaced about the tube with the axes parallel to each other. The assembly is then heated and drawn until the drawn three sided interstices between the adjacent rods and the other underlying tube closely accommodate the outer diameter of an optical fiber Referring to FIG. 1 it can be seen that the fibers 60 and 66 shown therein extend from the connector member 38 through the openings 45 in member 44 and into the interstices formed between the rods 50 and the tube 49. Where eight fibers are provided each of the fibers extends into its designated interstices through the opening until it reaches the end of the fiber housing 48 at the interface 68.

It should be understood that although eight openings are provided in the fiber housing 48 shown, a lesser number of optical fibers may be used with the specific fiber housing. Additionally, the rods 50 may be of smaller diameter so that a larger number may be used in combination with tube 49 and similarly a smaller number of rods of a larger diameter may be used to provide a smaller number of interstitial openings about the tube 49.

It should be noted that the fibers 52 through 66 have the other ends thereof secured in the openings provided therefor in connector member 38. Connector member 38 has a plurality of openings equal in number to the openings provided for receiving the fibers 52 through 66 in fiber housing 48. Accordingly, eight openings are provided in the connector member 38. As seen therein, the fibers 52 through 66 terminate at interface 67 in the openings. The fibers 52 through 66 are preferably secured in said openings by a suitable adhesive. The openings 41 are each flared at the outermost end of the connector member 38 to facilitate the insertion of optical fibers which are inserted into the openings with the end face thereof abutting the end face of optical fibers 52 through 66 at interface 67.

The coupling member 24 includes an end member 70 which is similar to end member 32. It includes a cylindrical flange 72 which is suitably secured to the mounting plate 28. The hollow portion of end member 70 extends through opening 74 provided in mounting plate 28. The end member 70 also includes an axially extending bore, the smaller portion of which houses a connector member 76 which is secured in the bore preferably by a press fit.

The end member 70 includes an annular flange 78 which surrounds the connector member 76. A plurality of axially extending openings 79 are provided in the connector member 76 which includes flared ends to facilitate the insertion of optical fibers 80 which terminate at interface 81 which is centrally disposed in the connector member 76. A tubular cylindrical member 82 is provided in the enlarged portion of the bore of end member 70. The cylindrical member 82 includes a bore which is enlarged to receive the end of the connector member 76.

The cylindrical member 82 includes a circular wall 84 which is fixedly mounted within the bore of member 82, preferably with a press fit. The wall includes a plurality of peripherally disposed spaced openings 86 through which optical fibers extend from the end member 70 to the interface 68 between the coupling members 22 and 24. The end 88 of rod 46 is secured in a central opening provided in wall 84 and is suitably secured therein by a press fit. The coupling member 24 also includes a fiber housing 90 which is similarly constructed to the fiber housing 48.

Figure 3:
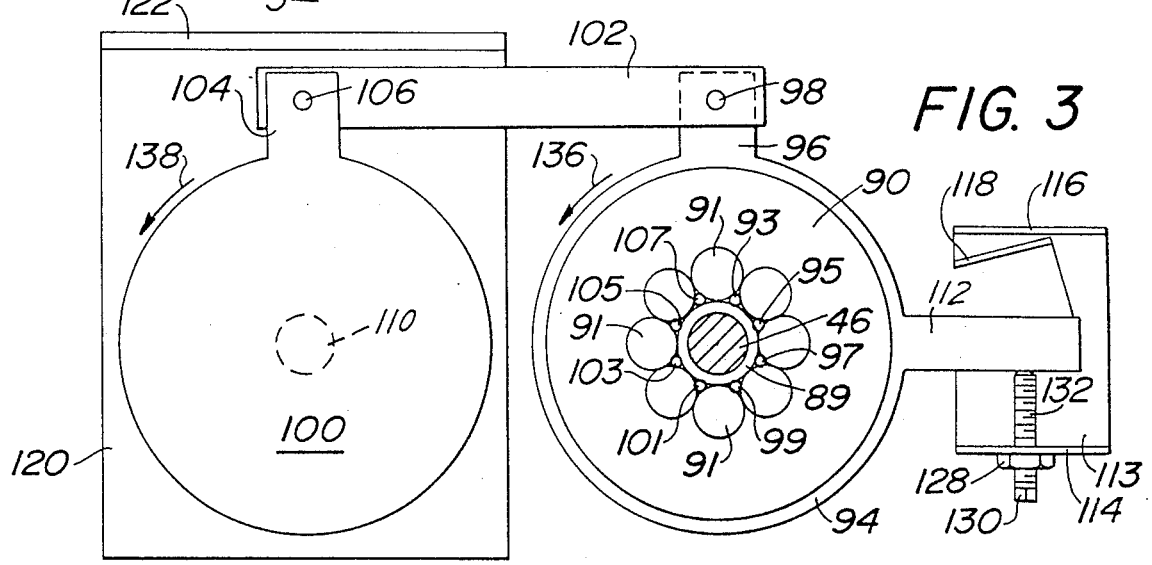
FIG. 3 is a sectional view taken along the line 3—3 in FIG. 1.

As best seen in FIG. 3 the fiber housing 90 comprises a cylindrical tube 89, eight cylindrical rods 91 and a jacket which forms a cylindrical housing or protective shield for the fiber housing 90. The jacket of housing 90 is formed like jacket 69 of housing 48. Between the interstices of each pair of rods 91 and tube 89 there is inserted the optical fibers 93 through 107. As will hereinafter be seen it is not required that eight fibers be provided in the eight openings provided therefor in the fiber housing 90.

The fiber housing 90 and fiber housing 48 are both mounted on the rod 46 which is telescoped through the tube 89 of fiber housing 90 and tube 49 of fiber housing 48. Provided about the fiber housing 90 is a circular plate 94 having a radially extending tab 96. There is provided between the end member 70 and the fiber housing 90 a helically wound coil spring 92. The coil spring 92 is mounted at one end about the cylindrical member 82 and extends to the circular plate 94 which is fixedly secured to and embraces the fiber housing 90.

The spring 92 acts to spring urge the end of the fiber housing 90 against the end of fiber housing 48 at the interface 68 between the end faces of the fiber housings.

It should be noted that the coupling member 22 is a completely fixed member with respect to plate 26. That is, the housing member 48 is fixedly secured to the cylindrical member 36 which is in turn securely fixed within the end member 32 which is in turn secured to the plate 26. The coupling member 24, however, includes a rotatable fiber housing 90 which rotates about the rod 46. The housing 90 thus rotates with respect to the end member 70 and is maintained in axial alignment with the fiber housing 48 by the rod 46 which is fit snuggly within the tubes 49 and 89. The fit of rod 46 within tube 89 through snuggly fit, still permits rotation of housing 90 about shaft 46.

As set forth above, the construction of the fiber housing 90 is similar to that of fiber housing 48. That is, the tube and rod assembly are drawn after being heated to form a fused interface between the rods and the tube which forms an interstice between each of the eight adjacent pairs of rods, each of which is dimensioned to closely accommodate the outer diameter of one of the optic fibers 93 through 107 which are insertable within the interstices of the fiber housing 89.

After the glass rod/tube assembly which is used to form the central portion of members 48 and 90 has been drawn, the assembly is scribed and broken into suitable lengths for use in the relay switch 20. The fiber housings which form a pair for use in the relay switch are chosen to have one cleaved face in common, which maximizes face-to-face matching for an interface between the fiber housings.

The desired number of fibers are fed into the designated interstices from the opposite end of the assembly from the face which forms the interface between the pair of fiber housings.

The fibers are inserted until they are flush with the coupling face of the fiber housing. The fibers are then secured in the housing by an adhesive such as an epoxy resin, allowed to cure, and then each of the rod/tube/fiber assemblies are then provided with a cylindrical jacket made of a potting material. The jacket, fiber ends, tube and rods are polished until the end faces of the fibers, tube, rods and jacket are perpendicular to the longitudinal axis of the tube, free of scratches and in the same plane. The end faces of the housings at the interface 68 are thus made smoothly slidable with respect to each other. Because both housings are mounted about the rod 46, which is closely dimensioned to fit within the tubes 49 and 89, respectively, there is close radial alignment between the members.

Where eight optic fibers are provided in the fiber housing 48 and eight fibers are also inserted in the fiber housing 90, the members 48 and 90 are so aligned that in a first position fiber 93 is axially aligned with fiber 52, fiber 95 is axially aligned with fiber 54, fiber 97 is axially aligned with fiber 56, fiber 99 is axially aligned with fiber 58, fiber 101 is axially aligned with fiber 60, fiber 103 is axially aligned with fiber 62, fiber 105 is axially aligned with fiber 64 and fiber 107 is axially aligned with fiber 66.

An index matching grease is preferably provided between the end faces of the housings 48 and 90 at the interface 68. The index matching grease not only facilitates the slidability of one member with respect to the other, but also acts to increase the transmissability of an optical signal from one aligned fiber to the other. As will hereinafter be seen, a linkage is provided which acts to move the housing 90 a predetermined angular amount so that there can be a switching of the alignment between the fiber ends in housing 90 with respect to the fiber ends in housing 48.

In order to switch the optical signal from one fiber to another, a torque is applied to tab 96 of plate 94 which thereby rotates the housing 90 about its axis. By rotating the housing 45° counter-clockwise, as seen in FIG. 3, it will cause the optic fiber 93 to be rotated to a position where the optic fiber 93 is axially aligned with optic fiber 66. Similarly, optic fiber 95 is then in a position where it is axially aligned with optical fiber 52 and so on.

It should also be understood that the fiber housing 90 can be rotated discretely to other angular positions. For example, the housing can be rotated 90°, 135° and 180° in accordance with the mechanism provided for the purpose of rotating the same. That is, where it is desired that an optical fiber in housing 90 be rotated to be aligned with an optical fiber two positions from the original position, the housing 90 is rotated 90°. To align a fiber three positions away requires moving the housing 90 135°; and four positions away it is rotated 180°.

However, it should be noted that moving the housing 45° counter-clockwise is preferred since it not only enables switching signals from one path to another, either singly or it multiples up to four, but it requires less flexibility of fibers 93 to 107. As an example of a single signal being switched between one of two paths, a single fiber is provided in either housing 90 or housing 49 with two fibers being provided in the other housings. Therefore, by providing a single fiber in housing 90 in the position in which a fiber 93 is shown in FIG. 3 and a pair of fibers in housing 48 in the position shown in FIG. 2 for fibers 52 and 66, a signal provided on fiber 92 and transmitted to optical fiber 52 can be rerouted to optical fiber 66 by rotation of the housing 90 45°. Similarly, by providing a single fiber in the position shown for optical fiber 52 in FIG. 2 and providing a pair of fibers in the position shown for fibers 93 and 95 in FIG. 3, a signal provided on fiber 52 may be switched from being passed to optical fiber 93 to optical fiber 95 by moving housing 90 to 45°.

In order to switch in multiples, the optical fibers in one of the housings is provided in every other position for an optical fiber while providing fibers in all the interstices of the other housing. Thus, if signals are being provided to optical fibers in housing 48, an optical fiber can be provided in every other interstitial opening, such as in the position shown for optical fibers 52, 56, 60 and 64. An optical fiber is provided in the position of each of the optical fibers 93 through 107 in housing 90. In a first position the signal on optical fiber 52 is transmitted to optical fiber 93, the signal on optical fiber 56 is passed to fiber 97, the signal on optical fiber 60 is passed to optical fiber 101 and the signal on optical fiber 64 is passed to optical fiber 105. When housing 90 is rotated 45° counter-clockwise as shown in FIG. 3, the signal on optical fiber 52 is passed to optical fiber 95, the signal on optical fiber 56 is passed to optical fiber 99, the signal on optical fiber 60 is passed to optical fiber 103 and the signal on optical fiber 64 is passed to optical fiber 107.

A similar effect can be achieved where it is desired to switch signals coming in from optical fibers 80 to different paths within the optical fibers within the housing 48. This is accomplished by placing the fibers in alternate interstitial openings of housing 90 while placing fibers in each of the interstitial openings of housing 48.

A rotating mechanism for the housing member 90 is shown in FIG. 3. The plate 94 includes a tab which is pivotally connected by a pin 98 to a linking rod 102. A solenoid 100 is provided which is adapted to be rotated about its axis and said solenoid includes a tab 104 which is pivotally connected to rod 102 by pin 106.

Pins 98 and 106 preferably include enlarged heads at each end so that the pins do not fall out of the openings through which they are provided in the tabs 104 and 96 and rod 102.

The solenoid 100 is rotatable about the axis of rod 110. As solenoid 100 rotates it causes rotation of plate 94 which is secured to housing 90. Plate 94 further includes a second tab 112 which extends to a mounting bracket 113. The mounting bracket 113 is U-shaped and includes a pair of laterally extending flanges 114 and 116. The bridging portion of the bracket 113 includes a cut-out portion which is bent perpendicular to the plane of the bridging portion of bracket 113 to form a flange 118 which is in a plane which extends in the direction of the longitudinal axis of housing 90.

The solenoid 100 is connected via rod 110 to a fixed bracket plate 120 having a flange 122. The solenoid 100 pivots about the axis through rod 110 and as it is rotated the housing 90 is rotated, as is the tab 112 of plate 94.

Connected to the flange 114 of the bracket 113 is an assembly comprised of a nut 128 having a threaded opening and a threaded rod which includes a head 130 and a threaded portion 132. The rod is threadedly secured in the flange 114 and is secured in place by tightening of the threaded nut 128. By rotation of the head 130, the threaded portion of the rod may be moved in accordance with the spatial requirements of alignment of the fibers in housing 90 with the fibers in housing 69.

The solenoid 100 is preferably comprised of an electrical solenoid but may also be an air operated or fluid operated solenoid.

When the solenoid 100 is actuated, rotation thereof causes rotation of housing 90. Thus, when solenoid 100 is rotated in the counter-clockwise direction it causes the rotation of housing 90 in the direction of arrow 136 as solenoid 100 is actuated in the direction of arrow 138. When the tab 112 abuts flange 118 of bracket 113, the rotation of the housing 90 is stopped in the counter-clockwise direction. Rotation in the opposite direction of solenoid 100 causes rotation of housing 90 until it is stopped by the abutment of tab 112 with the top surface of the threaded portion 132 of the threaded rod.

As set forth above, the bracket 113, including flange 118 and threaded rod 132 are suitably dimensioned to enable the rotation of housing 90 exactly 45 degrees. By suitable adjustment of the threaded portion 132 of the thraded rod, exact positioning of the fibers in housing 90 with the fibers in housing 69 is accurately accomplished. Any looseness in the linkage between the solenoid 100 and the housing 90 is also obviated by the direct stopping of the rotation of the plate 94 by the abutment of tab 112 thereof against the stops provided therefor in bracket 113.

It should be noted that the fibers 93 through 107 in the coupling member 24 are flexible and are longer than the space between the connector 76 and housing 90 so that rotation of the housing 90 with respect to the end member 70 is easily accommodated.

The fibers 93 through 107 are adhesively secured in openings 79 of connector member 76 and fibers 52 through 66 are adhesively received in openings 41 of connector member 38. The fibers 42 and 80 are also adhesively secured in the openings with the fibers being in intimate contact at the interfaces 67 and 81 to facilitate optical conductivity.

It should also be noted that the relay switch 20 may be provided with all of the interstitial opening of housings 48 and 90, each having an optical fiber therein. The number of fibers that are used for switching can then be determined by the number of fibers 42 inserted into connector member 38 and fibers 80 connected to the fibers in connector member 76.

It can therefore be seen that a new and improved fiber optic relay switch has been provided. The construction affords the switching of either a single channel or multiplicity of channels in a single movement.

Alignment is facilitated by forming of consecutive sections of the same glass rod/tube assembly to form a pair of housing members, thereby assuring the excellent radial alignment of fibers with respect to each other.

Alignment of the fibers is further facilitated by the glass tube and rod assembly which facilitates alignment of the optical fibers in the interstial passages provided therebetween.

In view of the fact that the tubes and rod are made of glass, a precision polish can be applied to the fibers at the time that the interface of each of the housing members is formed.

Because the rod/tube assembly is made of glass, it may be made in production quantities by inexpensive technologies. The assembly is thus subject to being mass produced. Also, the use of glass provides in inherently chemically inert hard abrasion resistant material which is not subject to dimensional instability as are other materials, such as plastics. Also, axial alignment is facilitated because of the hard inflexible material used.

In addition, because rotation can be precisely controlled, the construction of the coupling members facilitates accurate alignment when moving the housing members with respect to each other. In addition, the discrete movement enables accurate repeatability. The glass components further facilitate slidability with respect to each other.

It should also be noted that by more sophisticated coupling movements which enable the housing to be rotated to two or more specific positions, such as 45° and 90°, the signal on a single optical fiber may be switched to two different paths and more. Similarly, for multiple fiber relays additional pairs of rods may be incorporated around the periphery of the rods already located to provide further interstitial channels for the provision of further optical fibers in each of the housings 90 and 48.

Finally, the index matching lubricating grease, as provided at the interface, not only adds to the transmissiveness of the signals on the optical fibers to the fibers aligned therewith, but also enhances the rotatability of the housing members 48 and 90 with respect to each other and in addition prevents abrasion at the faces thereat.

An alternative coupling member 150, which may be used in place of the coupling member 22 of the optical relay switch, is shown in FIG. 4. The coupling member 150 basically comprises a single jacket 152 for a circular plate 154, a fiber cable end 156 carrying a plurality of fibers 158, and a tube/rod assembly. The tube/rod assembly is comprised of a glass tube 157 and a plurality of rods 160 which are formed similarly to tube 49 and rods 50 of housing member 48. The cable 156, as best seen in FIG. 5, basically comprises a cable shield which has been filled in with an epoxy about the end of the cable where the optical fibers 158 pass through the end of the cable shield. The optical fibers 158 are inserted into the interstitial channels between the rods 160 and the tube 157 and then the entire assembly is placed in potting material to form a cylindrical jacket for the assembly. The cable 156 is thus secured within the jacket 152 as seen in FIG. 5.

Figure 6:
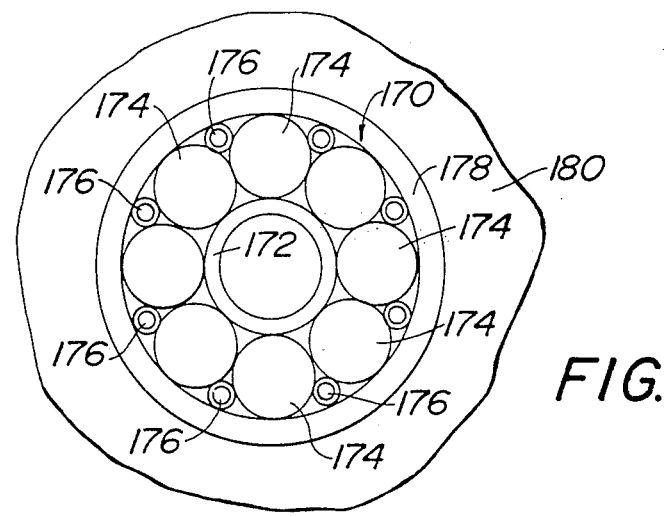
FIG. 6 is an end view of a second alternate coupling member for use in a fiber optic relay switch embodying the invention.

An alternate tube and rod assembly for use in connection with the holding members 48 and 90 in FIG. 3 is shown in FIG. 6. The assembly includes a tube 172 and a plurality of rods 174. In addition, an outer sleeve 178 which is also made of glass is provided which forms an interstitial channel between the rods 174 and the inner surface of the glass sleeve 178. Optical fibers 176 are then inserted in the interstitial channels between the pairs of rods in the inner surface of the sleeves 178. The assembly is also formed by heating the rods 174, tube 172 and sleeve 178 and drawing the same whereby the entire assembly is welded together to form an integral fused assembly. A potting material is then provided about the outer sleeve 178 to form a jacket 180 and then the optical fibers are inserted in the interstitial channels as shown in FIG. 6.

Without further elaboration, the foregoing will so fully illustrate our invention that others may, by applying current or future knowledge, readily adapt the same for use under various conditions of service.

What is claimed as the invention is:

1. A fiber optic relay switch for switching optical signals from a first fiber to a second fiber, said switch comprising a first member for housing at least one optic fiber and a second member for housing at least two optic fibers; said first and second members each having a coupling face and including a tube at the center thereof surrounded by a plurality of parallel rods which are secured to the periphery of said tube; each pair of adjacent rods and the outer peripheries of said tubes of said first and second members defining interstitial channels for reception of optic fibers; said faces of said first and second members being slidably disposed with respect to each other so that in a first position of said members the interstital channels thereof are aligned whereby the end of a fiber in said first member and having an end terminated with the coupling face of said first member is aligned with and optically coupled with the end of a fiber which is disposed in said second member and terminated with the coupling face of said second member, and in a second position of said members the end of such fiber in said first member is aligned with and optically coupled with the end of another fiber in said second member which latter end is terminated with the face of said second member whereby movement of said members relative to each other between said first and second positions switches the optical signals in a first path to a second path.

2. The fiber optic relay switch of claim 1 wherein said first and second member each include a tube at the center thereof surrounded by a plurality of parallel rods which are secured to the periphery of said tube, said tube and rods forming interstitial channels between each pair of adjacent rods and the outer periphery of the tube.

3. The fiber optic relay switch of claim 1 wherein each of said tubes is telescoped over a rod which fits snugly within the tube and enables rotation of one of said members about said rod.

4. The fiber optic relay switch of claim 1 wherein the interstitial openings of said first and second members are provided radially about said rod, a plurality of optic fibers being provided in alternate ones of the interstitial channels of said first member and a plurality of fibers being provided in adjacent ones of the interstitial channels of the second member so that rotation of said first member with respect to said second member causes a switching in multiple of signals from a first path to a second path.

5. A fiber optic relay switch of claim 1 wherein a linking mechanism is provided which is connected to said second member for rotating said second member a discrete angular amount so that the interstitial channels in said second member are aligned with the interstitial channels of said first member before and after rotation of said first and second members with respect to each other.

6. The fiber optic relay switch of claim 1 wherein said first member and said second member comprise cylindrical housings which are axially aligned, said coupling faces of said members forming the interface between the ends of said cylindrical members.

7. The fiber optic relay switch of claim 1 in which at least one optical fiber is housed in said first member and at least two optical fibers are housed in said second member.

8. A fiber optic relay switch for switching optical signals from a first fiber to a second fiber, said switch comprising a first member for housing at least one optic fiber and a second member for housing at least two optic fibers; said first and second members each having a coupling face and including a cylindrical surface engaging in tangential relationship a plurality of parallel rods which are secured to said cylindrical surface; each pair of adjacent rods and said cylindrical surfaces of said first and second members defining interstitial channels for reception of optic fibers; said faces of said first and second members being slidably disposed with respect to each other so that in a first position of said members the interstitial channels thereof are aligned whereby the end of a fiber in said first member and having an end terminated with the coupling face of said first member is aligned with and optically coupled with the end of a fiber which is disposed in said second member and terminated with the coupling face of said second member, and in a second position of said members the end of such fiber in said first member is aligned with and optically coupled with the end of another fiber in said second member which latter end is terminated with the face of said second member whereby movement of said members relative to each other between said first and second positions switches the optical signals in a first path to a second path.

9. The fiber optic relay switch of claim 8 in which said first and second members each include a tube at the center thereof about which said parallel rods are disposed; each of said tubes being telescoped over a rod which fits snugly within the tubes and enables rotation of one of said members about said rod.

10. The fiber optic relay switch of claim 8 wherein said first member and said second member comprise cylindrical housings which are axially aligned, said coupling faces of said members forming the interface between the ends of said cylindrical members.

11. The fiber optic relay switch of claim 8 wherein a linking mechanism is provided which is connected to said second member for rotating said second member a discrete angular amount so that the interstitial channels in said second member are aligned with the interstitial channels of said first member before and after rotation of said first and second members with respect to each other.

12. The fiber optic relay switch of claim 8 in which at least one optical fiber is housed in said first member and at least two optical fibers are housed in said second member.

* * * * *